(12) United States Patent
Utsunomiya et al.

(10) Patent No.: US 8,980,501 B2
(45) Date of Patent: Mar. 17, 2015

(54) FUEL CELL METAL SEPARATOR AND NOBLE METAL COATING METHOD THEREFOR

(75) Inventors: Masao Utsunomiya, Utsunomiya (JP); Teruyuki Ohtani, Tochigi-ken (JP); Toshiki Kawamura, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 150 days.

(21) Appl. No.: 13/439,335

(22) Filed: Apr. 4, 2012

(65) Prior Publication Data

US 2012/0258383 A1 Oct. 11, 2012

(30) Foreign Application Priority Data

Apr. 7, 2011 (JP) ................................. 2011-085531
Feb. 15, 2012 (JP) ................................. 2012-030023

(51) Int. Cl.
*H01M 4/64* (2006.01)
*H01M 8/02* (2006.01)
*C23C 24/04* (2006.01)
*H01M 8/10* (2006.01)

(52) U.S. Cl.
CPC .......... *H01M 8/0228* (2013.01); *H01M 8/0206* (2013.01); *H01M 2008/1095* (2013.01); *H01M 2250/20* (2013.01); *C23C 24/04* (2013.01); *Y02E 60/50* (2013.01); *Y02T 90/32* (2013.01)
USPC ............................. 429/522; 429/518; 429/519

(58) Field of Classification Search
CPC H01M 8/0228; H01M 8/0206; H01M 8/0202
USPC .......... 429/457, 518, 519, 520, 522; 427/115, 427/328
See application file for complete search history.

(56) References Cited

U.S. PATENT DOCUMENTS

| | | | |
|---|---|---|---|
| 7,846,593 B2 * | 12/2010 | Fabian et al. | ............. 429/517 X |
| 7,901,838 B2 * | 3/2011 | Sexton et al. | ............. 429/518 X |
| 2003/0068523 A1 * | 4/2003 | Kaneta et al. | ................. 428/670 |
| 2004/0229105 A1 * | 11/2004 | Miura | ............................ 429/38 |
| 2005/0100771 A1 | 5/2005 | Vyas et al. | |
| 2006/0088760 A1 * | 4/2006 | Lee | ................................ 429/129 |
| 2009/0042084 A1 | 2/2009 | Kobayashi et al. | |
| 2010/0239960 A1 | 9/2010 | Ishigami et al. | |
| 2010/0260928 A1 | 10/2010 | Hasegawa et al. | |

FOREIGN PATENT DOCUMENTS

| | | |
|---|---|---|
| DE | 11 2004 002 166 T5 | 9/2006 |
| EP | 1 445 815 A2 | 8/2004 |
| JP | 2002-298878 A | 10/2002 |
| JP | 2005-004998 A | 1/2005 |
| JP | 2005004998 A * | 1/2005 |

(Continued)

*Primary Examiner* — Zachary Best
(74) *Attorney, Agent, or Firm* — Carrier Blackman & Associates, P.C.; Joseph P. Carrier; William D. Blackman

(57) ABSTRACT

A first metal separator and an electrolyte electrode assembly are stacked in a fuel cell. The first metal separator comprises a convex portion that abuts against the electrolyte electrode assembly, and a concave portion forming an oxygen-containing gas flow channel between the electrolyte electrode assembly and the concave portion. A gold coating layer is formed on the convex portion. The gold coating layer includes a main gold coating portion and a reticulate gold coating portion that extends around the main gold coating portion.

12 Claims, 11 Drawing Sheets

(56) References Cited

FOREIGN PATENT DOCUMENTS

| | | | |
|---|---|---|---|
| JP | 2005-032594 | A | 2/2005 |
| JP | 2008-159420 | * | 7/2008 |
| JP | 2008-159420 | A | 7/2008 |
| JP | 2009-123352 | A | 6/2009 |
| JP | 2010-077464 | A | 4/2010 |
| JP | 2010-225360 | A | 10/2010 |
| WO | 2006/129806 | A1 | 12/2006 |

* cited by examiner

FUEL CELL METAL SEPARATOR AND NOBLE METAL COATING METHOD THEREFOR

CROSS-REFERENCE TO RELATED APPLICATION

This application is based upon and claims the benefit of priority from Japanese Patent Applications No. 2011-085531 filed on Apr. 7, 2011 and No. 2012-030023 filed on Feb. 15, 2012, of which the contents are incorporated herein by reference.

BACKGROUND OF THE INVENTION

1. Field of the Invention

The present invention relates to a fuel cell metal separator that makes up part of a fuel cell in which plural electrolyte electrode assemblies, each comprising a pair of electrodes provided on both sides of an electrolyte, are stacked, as well as to a noble metal coating method for such a metal separator.

2. Description of the Related Art

For example, a solid polymer electrolyte fuel cell employs a membrane electrode assembly (MEA), which includes an anode and a cathode provided on both sides of a polymer electrolyte membrane. The electrolyte membrane is a polymer ion exchange membrane. The membrane electrode assembly is sandwiched between a pair of separators to thereby make up a unit cell (power generating cell) for generating electricity.

With this type of fuel cell, when used in an automotive vehicle, normally, a predetermined number (e.g., several tens to several hundreds) of such unit cells are stacked together to form a fuel cell stack.

At this time, on surfaces of the separators, reactant gas flow fields are formed through which a reactant gas flows along surfaces of the electrodes. For this purpose, in the case that metal separators are used as the separators, convex portions that abut against the electrode surfaces and concave portions that form the reactant gas flow fields are provided therein by press-forming the metal separators in wave-like shapes.

In the above metal separators, it is required to maintain good conductivity, corrosion resistance, and abrasion resistance. For this reason, coating layers of gold are formed on surfaces of the metal separators.

For example, in Japanese Laid-Open Patent Publication No. 2010-077464, a method is disclosed in which convex portions of a plated member are brought into contact with a liquid holding member that is immersed in a plating bath, and electrolytic plating is carried out selectively on top surface parts of the convex portions. In this method, plating is performed in a Au plating bath, with a pulse current having the maximum electric current density of 20 to 260 A/dm² and the average electric current density of 5 to 26 A/dm².

SUMMARY OF THE INVENTION

However, with a metal separator on which a gold plating process has been implemented, it is easy for the gold to peel off, and over time, there is a concern that such metal separators cannot be used satisfactorily. For this reason, the useful service life of such metal separators tends to decline.

The present invention has the object of solving this type of problem, by providing a fuel cell metal separator in which peeling of a noble metal can effectively be suppressed, and which is capable of maintaining good conductivity, corrosion resistance, and abrasion resistance, together with a noble metal coating method for such a metal separator.

The present invention relates to a fuel cell metal separator of a fuel cell, the fuel cell being formed by stacking the fuel cell metal separator and an electrolyte electrode assembly, the electrolyte electrode assembly comprising a pair of electrodes provided on both sides of an electrolyte, as well as to a noble method coating method for such a metal separator.

Convex portions that abut against the electrolyte electrode assembly, and concave portions that form reactant gas flow channels between the electrolyte electrode assembly and the concave portions, are provided in the metal separator by forming a metal plate in a wave-like shape. In addition, noble metal coating layers are formed on the convex portions, wherein the noble metal coating layers include main noble metal coating portions and reticulate noble metal coating portions that extend around the main noble metal coating portions.

Further, the noble metal coating method for a fuel cell metal separator includes the steps of performing a surface roughening treatment on the convex portions, and ejecting noble metal particles from an inkjet device to form noble metal coating layers on the convex portions, which have been subjected to the surface roughening treatment.

According to the present invention, the noble metal coating layers, which are formed on the convex portions of the metal separator, include the main noble metal coating portions, and the reticulate noble metal coating portions that extend around the main noble metal coating portions. Owing thereto, the noble metal coating layers can firmly and reliably be disposed on the convex portions of the metal separator, and peeling off of the noble metal from the convex portions can be suppressed to the greatest extent possible. At least gold, platinum, or silver may be used as the noble metal.

In accordance therewith, peeling of such noble metals can effectively be suppressed, while good conductivity, corrosion resistance, and abrasion resistance can be maintained.

Further, according to the present invention, after the convex portions of the metal separator have been subjected to a surface roughening treatment, the noble metal coating layers are formed on the convex portions via an inkjet device. Accordingly, the noble metal flows in a reticulate shape, whereby the reticulate noble metal coating portions are formed at locations of the convex portions that have been subjected to the surface roughening treatment. Owing thereto, noble metal coating layers can firmly and reliably be disposed on the convex portions of the metal separator, and peeling off of the noble metal from the convex portions can be suppressed to the greatest extent possible.

In accordance therewith, peeling of such noble metals can effectively be suppressed, while good conductivity, corrosion resistance, and abrasion resistance can be maintained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
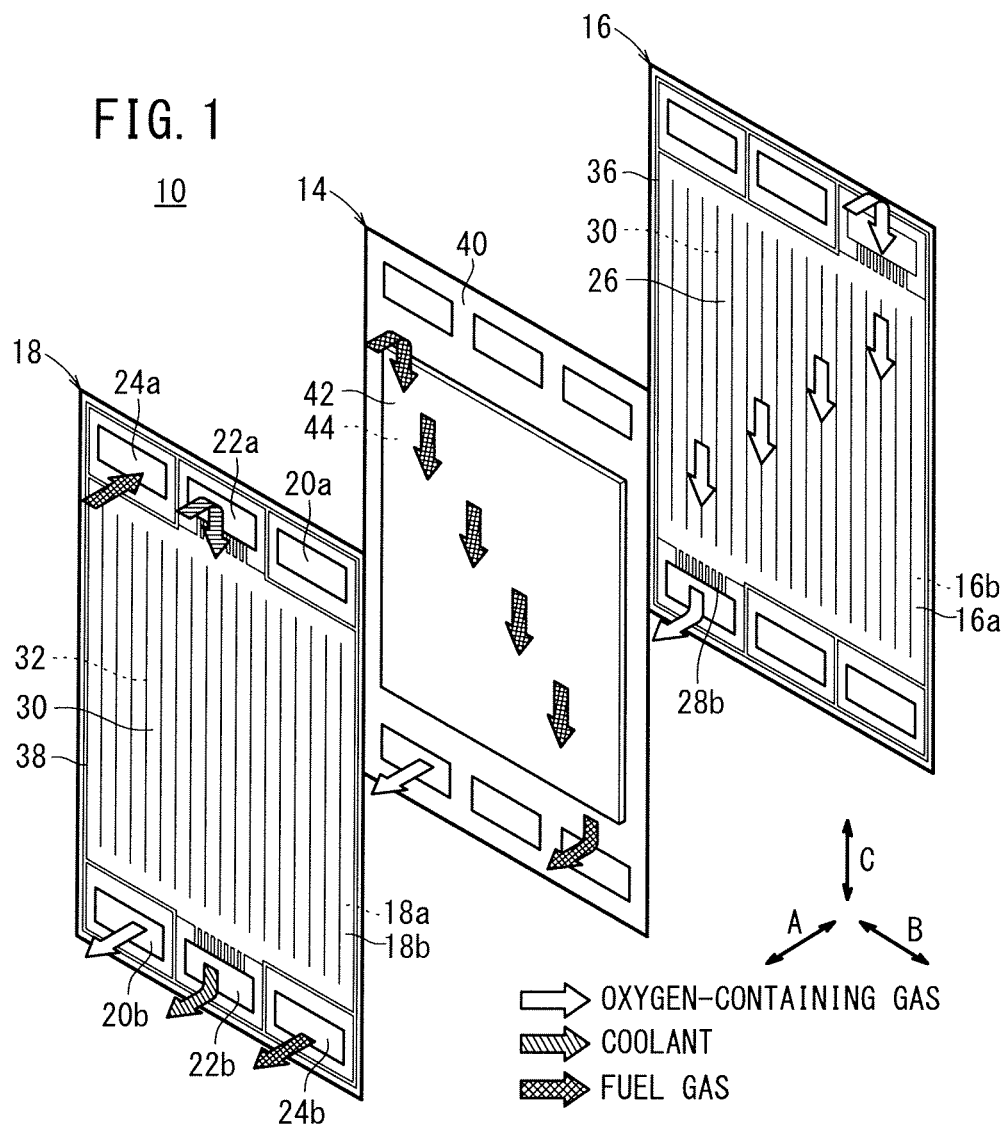
FIG. 1 is an explanatory exploded perspective view showing main components of a fuel cell in which there are incorporated first and second metal separators that form fuel cell metal separators according to a first embodiment of the present invention.
Figure 2:
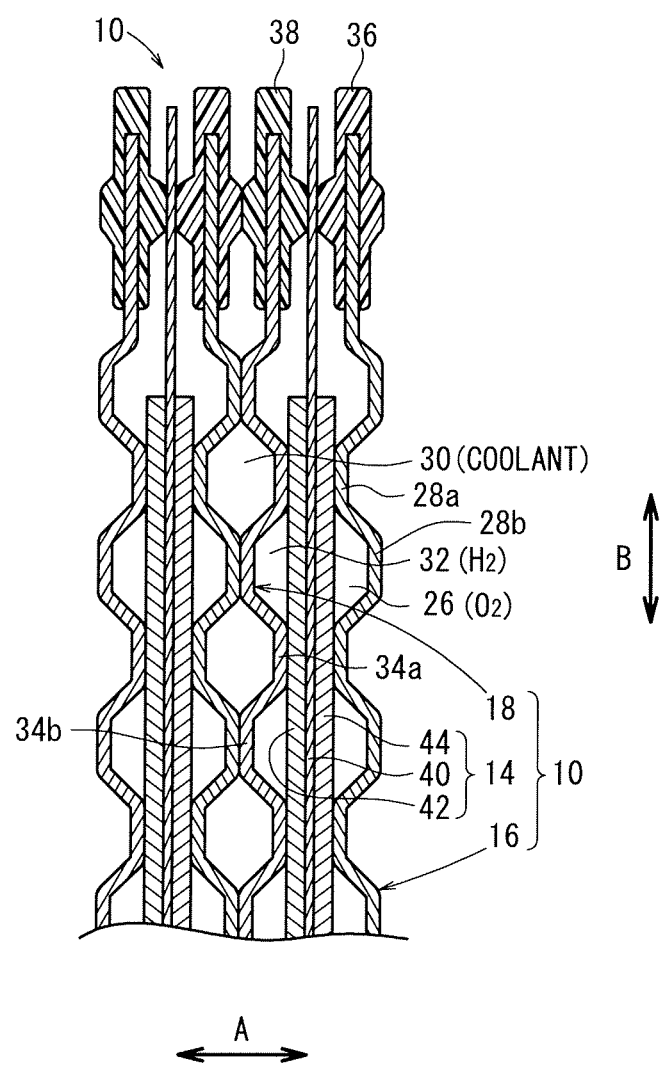
FIG. 2 is an explanatory cross sectional view of the fuel cell.

As shown in FIGS. 1 and 2, a fuel cell 10 includes a membrane electrolyte assembly (electrolyte electrode assembly) 14, which is sandwiched between a first metal separator 16 and a second metal separator 18 according to a first embodiment of the present invention. The membrane electrode assembly 14, the first metal separator 16, and the second metal separator 18 are stacked in a horizontal direction (the direction of the arrow A) with electrode surfaces thereof being arranged as vertical surfaces.

The first metal separator 16 and the second metal separator 18 are of a vertically elongate shape extending in the direction of gravity. The first metal separator 16 and the second metal separator 18, for example, are constituted from steel plates, stainless steel plates, aluminum plates, or plated steel sheets or the like, having flat rectangular shapes. In addition, the first metal separator 16 and the second metal separator 18 are formed with irregular shapes in cross section by carrying out a pressing process to form the metal thin plates in a wave-like shape.

On an upper edge portion in the direction of gravity (the direction of the arrow C) of the fuel cell 10, an oxygen-containing gas inlet passage 20a for supplying an oxidizing gas, e.g., an oxygen-containing gas, a coolant inlet passage 22a for supplying a coolant, and a fuel gas inlet passage 24a for supplying a fuel gas, e.g., a hydrogen-containing gas, are arranged and disposed in the direction of the arrow B (in a horizontal direction).

On a lower edge portion in the direction of gravity of the fuel cell 10, an oxygen-containing gas outlet passage 20b for discharging the oxygen-containing gas, a coolant outlet passage 22b for discharging the coolant, and a fuel gas outlet passage 24b for discharging the fuel gas, are arranged and disposed in the direction of the arrow B.

In a surface 16a on a side of the membrane electrode assembly 14 of the first metal separator 16, linear oxygen-containing gas flow channels 26 are disposed that extend in the direction of gravity. As shown in FIG. 2, in the first metal separator 16, there are provided convex portions 28a that abut against the membrane electrode assembly 14, and concave portions 28b that form the oxygen-containing gas flow channels 26 between the first metal separator 16 and the membrane electrode assembly 14.

The oxygen-containing gas flow channels 26 communicate with the oxygen-containing gas inlet passage 20a and the oxygen-containing gas outlet passage 20b. On a surface 16b of the first metal separator 16, coolant flow channels 30 are formed by back surface sides of the convex portions 28a, which also define the back surface shape of the oxygen-containing gas flow channels 26. The coolant flow channels 30 communicate with the coolant inlet passage 22a and the coolant outlet passage 22b.

Figure 3:
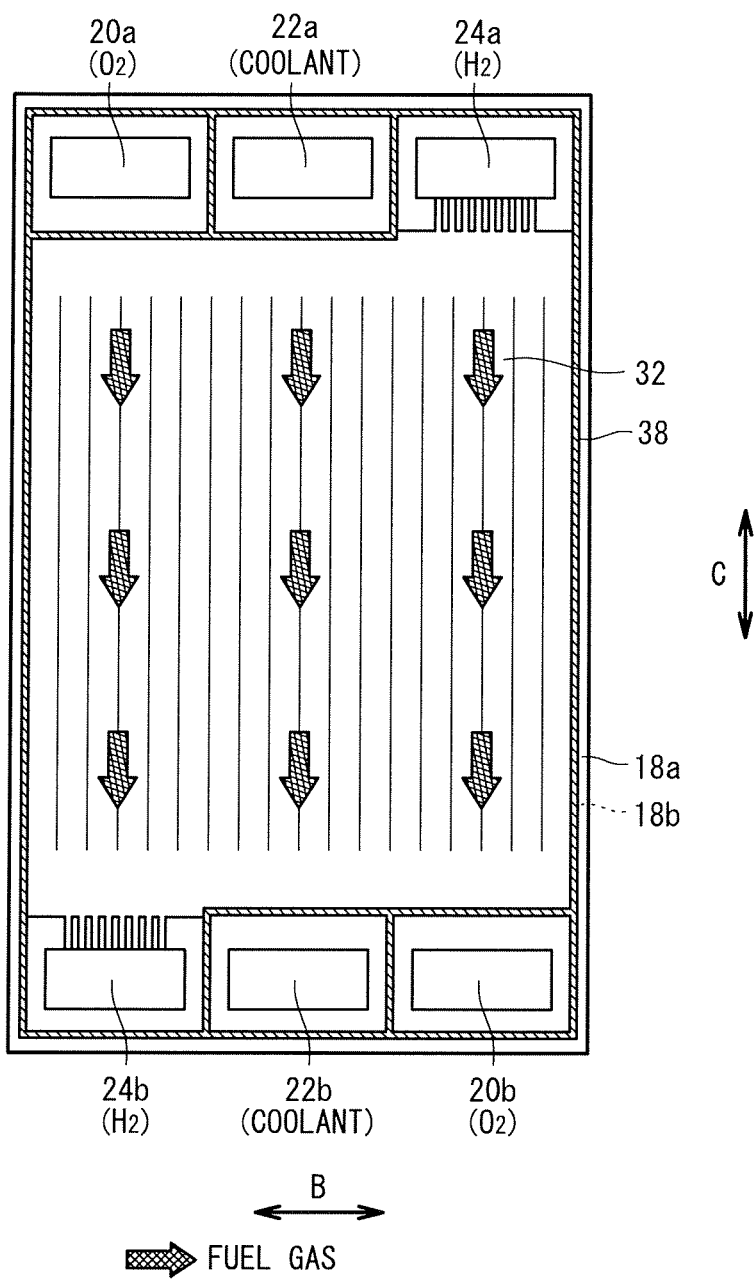
FIG. 3 is an explanatory front view of the second metal separator.

As shown in FIG. 3, on a surface 18a on the side of the membrane electrode assembly 14 of the second metal separator 18, linear fuel gas flow channels 32 communicate with the fuel gas inlet passage 24a and the fuel gas outlet passage 24b, and are formed to extend in the direction of the arrow C (in the direction of gravity). As shown in FIG. 2, in the second metal separator 18, there are provided convex portions 34a that abut against the membrane electrode assembly 14, and concave portions 34b that form the fuel gas flow channels 32 between the second metal separator 18 and the membrane electrode assembly 14.

A first seal member 36 is formed integrally on the surfaces 16a, 16b of the first metal separator 16, e.g., by baking or injection molding, around the outer peripheral edge of the first metal separator 16. A second seal member 38 is formed integrally on the surfaces 18a, 18b of the second metal separator 18, around the outer peripheral edge of the second metal separator 18.

The first seal member 36 and the second seal member 38 are made of a seal material, a cushion material, or a packing material such as, for example, EPDM, NBR, fluoro rubber, silicone rubber, fluoro silicone rubber, butyl rubber, natural rubber, styrene rubber, chloroprene rubber, or acrylic rubber. More preferably, a rubber material having a water-repellent effect, for example, silicone rubber (silicone, etc.) is used.

As shown in FIGS. 1 and 2, the membrane electrode assembly 14, is equipped with a solid polymer electrolyte membrane 40 formed by impregnating a thin membrane of perfluorosulfonic acid with water, for example, together with an anode 42 and a cathode 44, which sandwich the solid polymer electrolyte membrane 40 therebetween.

Each of the anode 42 and the cathode 44 has a gas diffusion layer such as carbon paper, and an electrode catalyst layer of platinum alloy supported on carbon particles. The carbon particles are deposited uniformly on the surface of the gas diffusion layer. The electrode catalyst layer of the anode 42 and the electrode catalyst layer of the cathode 44 are fixed to both surfaces of the solid polymer electrolyte membrane 40, respectively.

Figure 4:
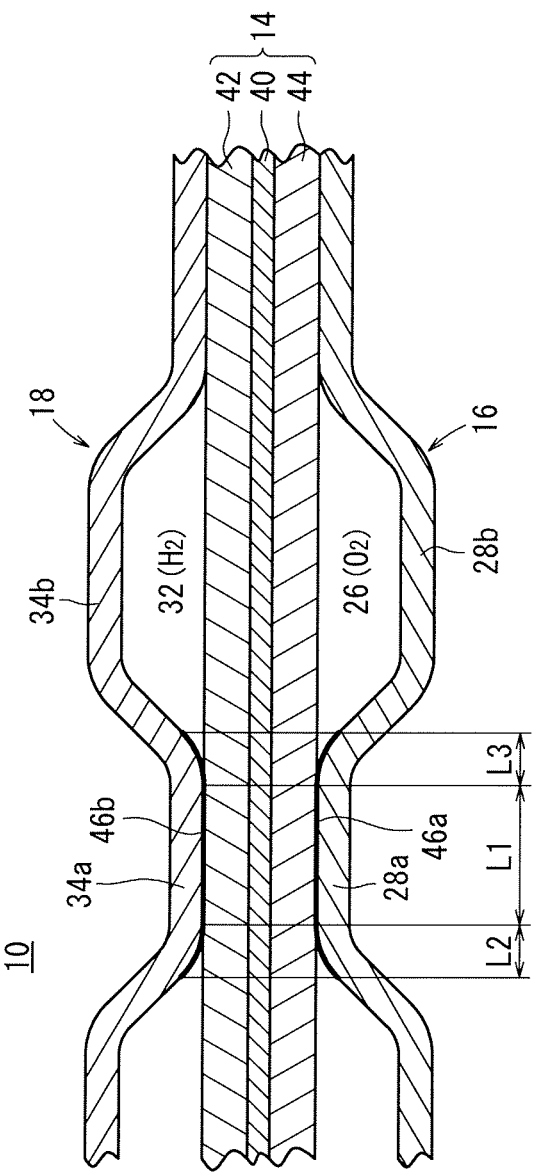
FIG. 4 is an explanatory cross sectional view showing main components of the fuel cell.

As shown in FIG. 4, on the convex portions 28a of the first metal separator 16 and on the convex portions 34a of the second metal separator 18, there are formed gold coating layers (noble metal coating layers) 46a, 46b made up solely from noble metal particles, for example, fine gold particles. As the noble metal particles, apart from fine gold particles, there may be used fine platinum particles, or fine silver particles.

The gold coating layers 46a, 46b are positioned within a flat region L1 and on both sides of the flat region L1, and cover corners of the convex portions 28a, 34a. More specifically, the gold coating layers 46a, 46b include rounded regions L2, L3 that are disposed to cover rounded parts of the convex portions 28a, 34a.

Figure 5:
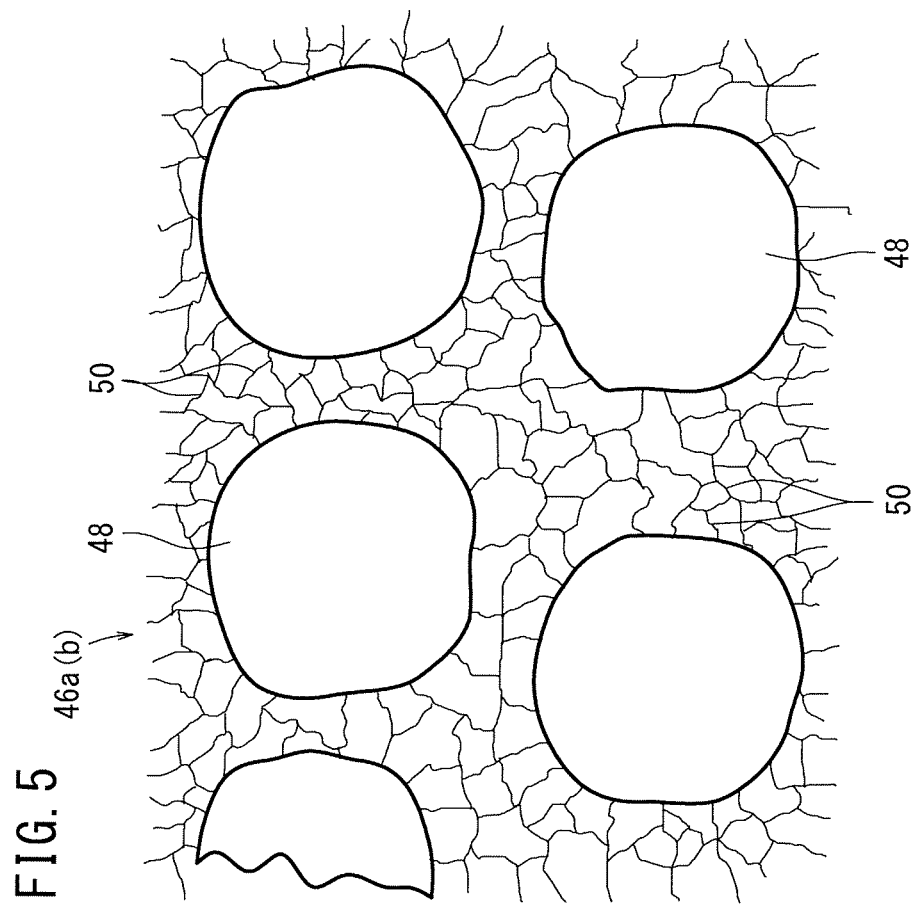
FIG. 5 is an explanatory diagram of gold coating layers that are provided on convex portions of the first and second metal separators.

As shown in FIG. 5, the gold coating layers 46a, 46b include main gold coating portions (main noble metal coating portions) 48, and reticulate gold coating portions (reticulate noble metal coating portions) 50. As described later, the main gold coating portions 48 have dot shapes that are formed by an inkjet device, whereas the reticulate gold coating portions 50, for example, include irregular reticulate shapes (amoeba shapes) formed along grain boundaries of the first metal separator 16 and the second metal separator 18 on the convex portions 28a, 34a.

The gold coating layers 46a, which are mutually adjacent to each other, are constituted by intertwining each of the reticulate gold coating portions 50, and the gold coating layers 46b, which are mutually adjacent to each other, are constituted by intertwining each of the reticulate gold coating portions 50.

Next, a gold coating method (noble metal coating method) for coating the first metal separator 16 will be explained below. The gold coating method for the second metal separator 18 is the same as that for the first metal separator 16, and therefore, detailed explanations in relation to the second metal separator 18 are omitted.

Figure 6:
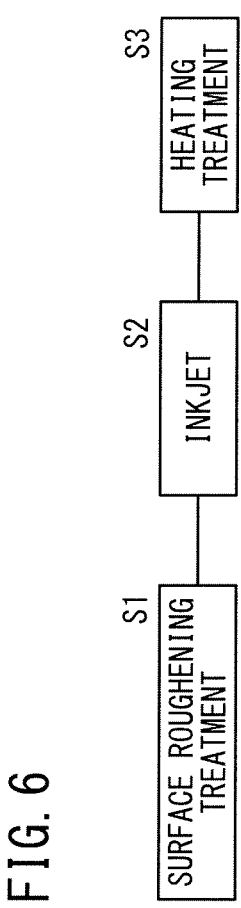
FIG. 6 is an explanatory diagram of process steps for forming the gold coating layers.

As shown in FIG. 6, the gold coating method includes a step (S1) of performing a surface roughening treatment on the convex portions 28a, a step (S2) of ejecting gold particles from an inkjet device to form gold coating layers 46a on the convex portions 28a, which have been subjected to the surface roughening treatment, and a step (S3) of performing a heating treatment on the convex portions 28a on which the gold coating layers 46a have been formed.

In greater detail, at first, a steel plate (i.e., a general SUS material) that constitutes the first metal separator 16 is immersed in an acid such as nitric acid or sulfuric acid, and is subjected to an electrolytic etching process. As a result of this process, etching is performed preferentially at the grain boundaries of the steel plate, whereby the surface roughening treatment is implemented effectively on the steel plate.

As the surface roughening process, apart from the aforementioned etching process with acid, different processes such as another solution based electrolytic etching process, a scarfing process using ferric chloride, an abrading process using a metal brush, or a photoetching process may be adopted.

Figure 7:
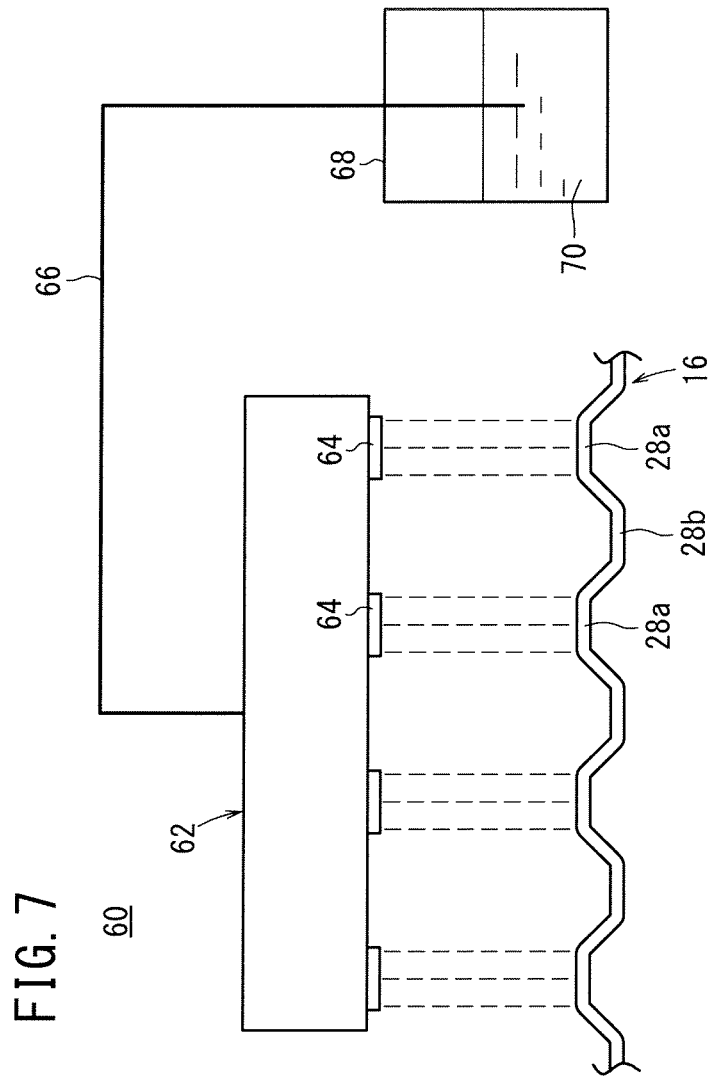
FIG. 7 is an explanatory diagram of an inkjet device.

Next, as shown in FIG. 7, a gold coating process is performed by an inkjet device 60. The inkjet device 60 is equipped with an inkjet head 62, with multiple nozzles 64 disposed on the inkjet head 62. Each of such nozzles 64 is set at a coating width dimension corresponding to the gold coating range (encompassing the flat region L1 and the rounded regions L2, L3) of the convex portions 28a.

One end of a supply line 66 is connected to one end of the inkjet head 62, and the other end of the supply line 66 is immersed in a solution 70 in the interior of an ink container 68. The solution 70, for example, includes only both of fine gold particles of 10 nm or less and a dispersing agent for dispersing the fine gold particles. The dispersing agent is a so-called surfactant having a chemical structure possessing a hydrophilic group and a hydrophobic group contained within a single molecule. If an organic solvent is used as the solution, in the dispersing agent contained within the organic solvent, the hydrophilic group is arranged facing toward the periphery of the fine gold particles, whereas the hydrophobic group is arranged facing outwardly of the hydrophilic group.

Consequently, the solution 70 is coated on the first gold separator on which the surface roughening process has been performed, from the inkjet head 62 that constitutes the inkjet device. As a result, coated surfaces are formed by the solution 70 on each of the convex portions 28a of the first metal separator 16.

Furthermore, a heating treatment is implemented on the first metal separator 16. In accordance therewith, the dispersing agent is decomposed and eliminated, and the fine gold particles themselves are subjected to sintering on the convex portions 28a and become integral therewith. Accordingly, the gold coating layers 46a are formed on the convex portions 28a.

In this case, according to the first embodiment, the gold coating layers 46a include the dot-shaped main gold coating portions 48 that correspond to shapes of the ejector openings of each of the nozzles of the inkjet head 62, and the reticulate gold coating portions 50, which have irregular reticulate shapes (amoeba shapes) along the grain boundaries formed by etching. In addition, at the gold coating layers 46a, which are mutually adjacent to each other, each of the reticulate gold coating portions 50 are intertwined.

Figure 8:
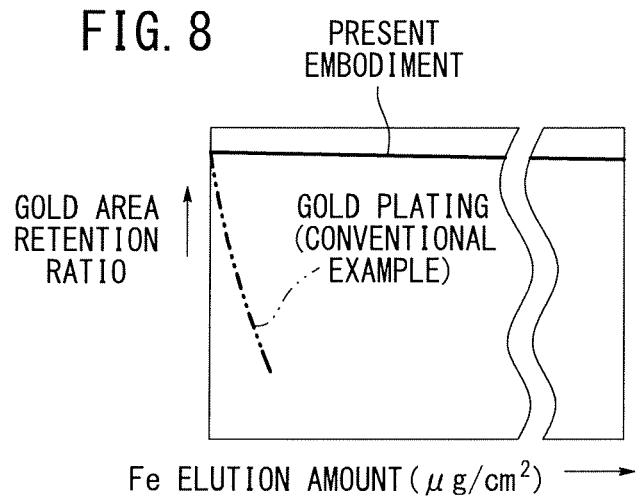
FIG. 8 is an explanatory diagram showing a relationship between the first embodiment and a conventional example, concerning gold peel strength when the base material undergoes corrosion.

Owing thereto, the gold coating layers 46a are provided reliably and firmly on the convex portions 28a of the first metal separator 16, whereby peeling off of the gold coating layers 46a from the convex portions 28a is suppressed to the greatest extent possible. More specifically, as shown in FIG. 8, compared to a prior art example formed by a metal plating process, with the first embodiment, the gold peel strength when the base material (steel plate) undergoes corrosion can be significantly improved. In FIG. 8, the horizontal axis indicates an iron elution amount, which is eluted in accordance with the steel plate being subjected to corrosion, whereas the vertical axis indicates the gold area percentage upon corrosion with respect to the gold area percentage prior to the steel plate suffering from corrosion.

Consequently, with the first embodiment, peeling of noble metals from the convex portions 28a can effectively be suppressed, while good conductivity, corrosion resistance, and abrasion resistance can be maintained.

Figure 9:
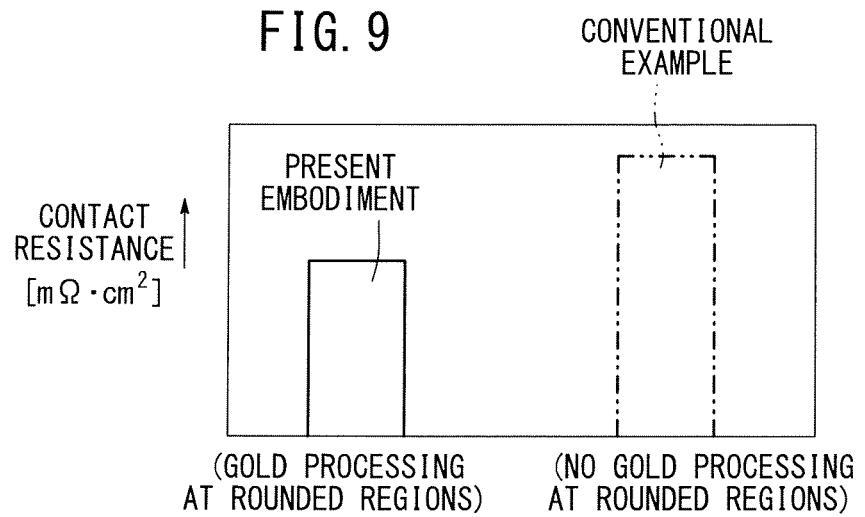
FIG. 9 is an explanatory diagram showing a relationship between the first embodiment and a conventional example, concerning contact resistance.

Furthermore, with the first embodiment, the gold coating layers 46a are disposed to cover corner parts of the convex portions 28a of the first metal separator 16 (rounded regions L2, L3 in FIG. 4). In the fuel cell 10, because loads are applied in the stacking direction, it is easy for the corner parts of the convex portions 28a to enter into the membrane electrode assembly 14 (mainly the surface of the gas diffusion layer). Accordingly, as shown in FIG. 9, compared to the conventional example in which gold coating layers 46a are not provided on the corner parts of the convex portions 28a, with the first embodiment, contact resistance is reduced considerably.

Still further, in the first embodiment, the gold coating layers 46a are constituted solely from gold. Owing thereto, for example, compared to a case of a resin material being mixed therein, a suitable conductive path can be formed securely.

Moreover, the coolant flow channels 30 are formed by bringing the first metal separator 16 of one of the fuel cells 10 and the second metal separator 18 of another of the fuel cells 10 mutually into abutment with each other (see FIG. 2). For this reason, the gold coating layers 46a, 46b are formed on convex portions (back surface shapes of the concave portions 28b) of the first metal separator 16, and on the convex portions (back surface shapes of the concave portions 34b) of the second metal separator 18, which are in mutual abutment.

Accordingly, contact resistance of the mutually abutting first metal separator 16 and second metal separator 18 can favorably be reduced.

Operations of the fuel cell 10 shall be described below.

First, as shown in FIG. 1, an oxidizing gas, e.g., an oxygen-containing gas, is supplied to the oxygen-containing gas inlet passage 20a, and a fuel gas, e.g., a hydrogen-containing gas, is supplied to the fuel gas inlet passage 24a. Moreover, a coolant, such as pure water, ethylene glycol, oil or the like, is supplied to the coolant inlet passage 22a.

As a result, the oxygen-containing gas is supplied to the oxygen-containing gas flow channels 26 of the first metal separator 16 from the oxygen-containing gas inlet passage 20a. The oxygen-containing gas moves in the direction of gravity along the oxygen-containing gas flow channels 26, and is supplied to the cathode 44 of the membrane electrode assembly 14.

On the other hand, as shown in FIG. 3, the fuel gas is supplied to the fuel gas flow channels 32 of the second metal separator 18 from the fuel gas inlet passage 24a. The fuel gas moves in the direction of gravity along the fuel gas flow channels 32, and is supplied to the anode 42 of the membrane electrode assembly 14.

Accordingly, in each of the membrane electrode assemblies 14, the oxygen-containing gas supplied to the cathode 44 and the fuel gas supplied to the anode 42 are partially consumed in electrochemical reactions within electrode catalyst layers for thereby generating electricity.

Further, as shown in FIG. 1, the coolant is introduced to the coolant flow channels 30 between the first metal separator 16 and the second metal separator 18 from the coolant inlet passage 22a. The coolant moves in the direction of gravity along the coolant flow channels 30, and after having cooled the electricity generating surfaces of the membrane electrode assembly 14, is discharged into the coolant outlet passage 22b.

The oxygen-containing gas that flows along the oxygen-containing gas flow channels 26 is discharged into the oxygen-containing gas outlet passage 20b, whereas the fuel gas that flows along the fuel gas flow channels 32 is discharged into the fuel gas outlet passage 24b.

Figure 10:
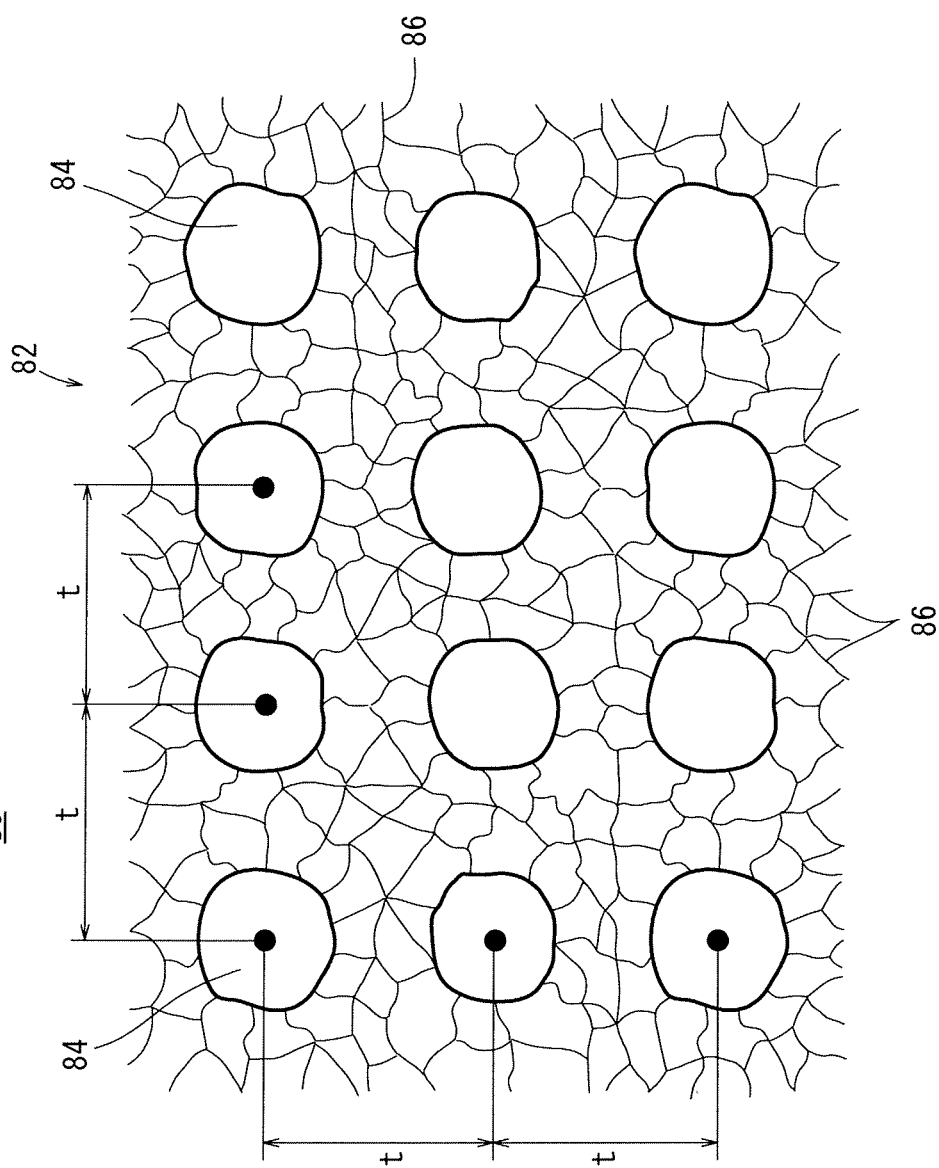
FIG. 10 is an explanatory diagram of gold coating layers that are provided on convex portions of a fuel cell metal separators according to a second embodiment of the present invention.

FIG. 10 is an explanatory diagram of gold coating layers (noble metal coating layers) 82 that are provided on convex portions of a fuel cell metal separator 80 according to a second embodiment of the present invention.

The gold coating layers 82 are formed from noble metal particles, for example, fine gold particles only, and include main gold coating portions (main noble metal coating portions) 84, and reticulate gold coating portions (reticulate noble metal coating portions) 86 surrounding the main gold coating portions 84. The gold coating layers 82, which are mutually adjacent to each other, are constituted by intertwining each of the reticulate gold coating portions 86.

The fine gold particles that are ejected from the inkjet device 60 (see FIG. 7) form a dot pattern, in which dots are arranged in a lattice, each being separated by a fixed interval t. The area percentage of fine gold particles is set such that the gold coating layers 82 exhibit a hydrophilic property or a hydrophobic property.

Figure 11:
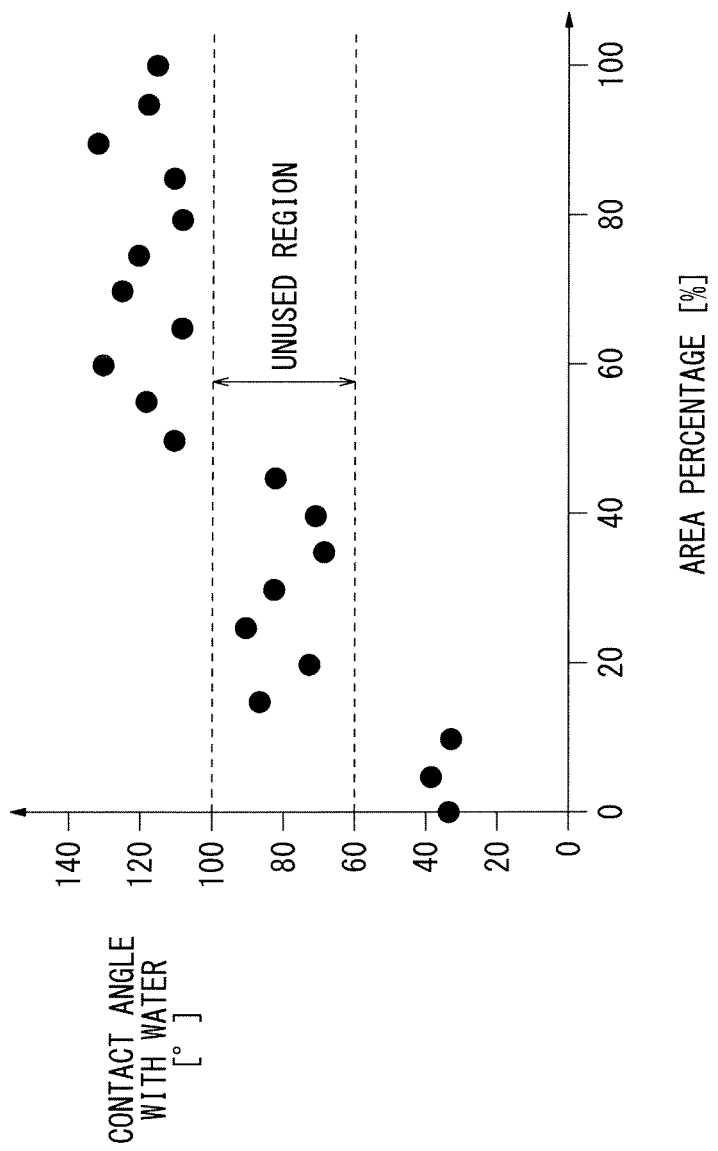
FIG. 11 is an explanatory diagram showing changes in the contact angle with water, as affected by the area percentage of gold.

More specifically, stainless steel (e.g., SUS316L) was immersed in a 40 degree Baume ferric chloride solution heated to 40° C. for three minutes, and with respect to the material surface on which acid cleaning has been performed, gold printing was carried out to produce dots thereon having a dot diameter of 150 μm using an inkjet method. In addition, when the contact angle with water in accordance with the area proportion was detected, the relationship shown in FIG. 11 was obtained.

In accordance therewith, when the area percentage was 10% or less, it was determined to exhibit a hydrophilic property (contact angle of 60° or less), whereas when the area percentage was 50% or greater, it was determined to exhibit a hydrophobic property (contact angle of 100° or greater). Accordingly, by setting the area percentage of the gold coating layers 82 at the metal separator 80, it is possible for a hydrophilic or hydrophobic property to be exhibited.

Further, the same process as above was carried out using silver as the noble metal. As a result, when the area percentage thereof was 65% or less, it was determined to have a hydrophilic property. Owing thereto, in the case that a hydrophilic characteristic is demanded, gold at an area percentage of 10% or less, or alternatively, silver at an area percentage of 65% or less, can be utilized.

If platinum is used as the noble metal, in the same manner as described above, by setting the area percentage thereof, a desired function (hydrophobic or hydrophilic) can be exhibited.

Although certain preferred embodiments of the present invention have been shown and described in detail, it should be understood that various changes and modifications may be made therein without departing from the scope of the appended claims.

What is claimed is:

1. A fuel cell metal separator of a fuel cell, the fuel cell being formed by stacking the fuel cell metal separator and an electrolyte electrode assembly, the electrolyte electrode assembly comprising a pair of electrodes provided on both sides of an electrolyte, wherein:
   convex portions that abut against the electrolyte electrode assembly and concave portions that form reactant gas flow channels between the electrolyte electrode assembly and the concave portions, are provided in the metal separator by forming a metal plate with a wave-shaped profile;
   noble metal coating layers are formed on the convex portions; and
   the noble metal coating layers include main noble metal coating portions which are dot-shaped, and reticulate noble metal coating portions that extend completely around the main noble metal coating portions,
   wherein the reticulate noble metal coating portions are irregular reticulate noble metal coating portions formed by a surface roughening process using acid.

2. The metal separator according to claim 1, wherein the reticulate noble metal coating portions are formed along grain boundaries of the metal plate.

3. The metal separator according to claim 1, wherein the noble metal coating layers, which are mutually adjacent to each other, are constituted by intertwining each of the reticulate noble metal coating portions.

4. The metal separator according to claim 1, wherein the noble metal coating layers are disposed to cover corner parts of the convex portions.

5. The metal separator according to claim 1, wherein:
   coolant flow channels are formed by bringing two of the metal separators mutually into abutment with each other; and
   respective noble metal coating layers are formed on mutually abutting convex portions of the two metal separators.

6. The metal separator according to claim 1, wherein the noble metal coating layers are constituted solely from gold.

7. The metal separator according to claim 1, wherein the main noble metal coating portions form a dot pattern, in which dots are arranged in a lattice, the dots being separated by a fixed interval from each other.

8. A noble metal coating method for a fuel cell metal separator of a fuel cell, the fuel cell being formed by stacking the fuel cell metal separator and an electrolyte electrode assembly, the electrolyte electrode assembly comprising a pair of electrodes provided on both sides of an electrolyte, wherein:
- convex portions that abut against the electrolyte electrode assembly and concave portions that form reactant gas flow channels between the electrolyte electrode assembly and the concave portions are provided in the metal separator by forming a metal plate with a wave-shaped profile, the noble metal coating method comprising the steps of:
performing a surface roughening treatment using acid on the convex portions; and
ejecting noble metal particles from an inkjet device to form noble metal coating layers on the convex portions, which have been subjected to the surface roughening treatment such that the noble metal coating layers include main noble metal coating portions which are dot-shaped, and irregular reticulate noble metal coating portions that extend completely around the main noble metal coating portions.

9. The noble metal coating method according to claim 8, wherein the noble metal particles ejected from the inkjet device form a dot pattern, in which dots are arranged in a lattice, the dots being separated by a fixed interval from each other.

10. The noble metal coating method according to claim 8, wherein the noble metal particles ejected from the inkjet device are set at a predetermined area percentage so as to exhibit a hydrophilic property or a hydrophobic property.

11. The noble metal coating method according to claim 8, wherein only a dispersing agent made up from a hydrophilic group and a hydrophobic group is added to the noble metal particles.

12. The noble metal coating method according to claim 8, including a further step of heat treating the metal separator after the noble metal coating layers have been formed on the convex portions.

* * * * *